Sept. 29, 1970  J. A. ALVAREZ ET AL  3,531,449
GLYCOL DRYING IN A METHYL CHLORIDE DEHYDRATION PLANT
Filed Oct. 31, 1968
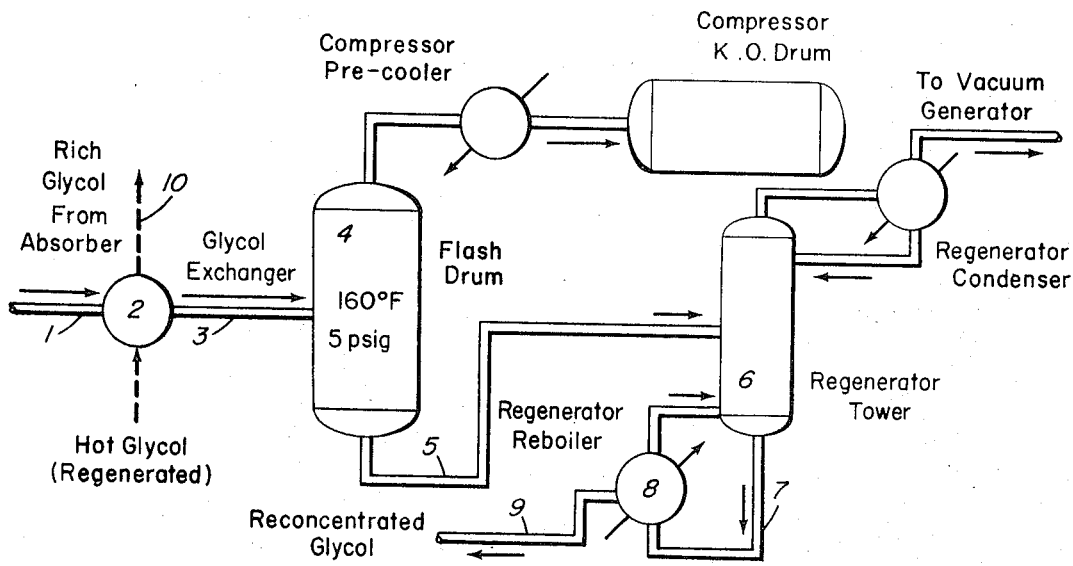
Figure I
CONVENTIONAL GLYCOL REGENERATION SYSTEM
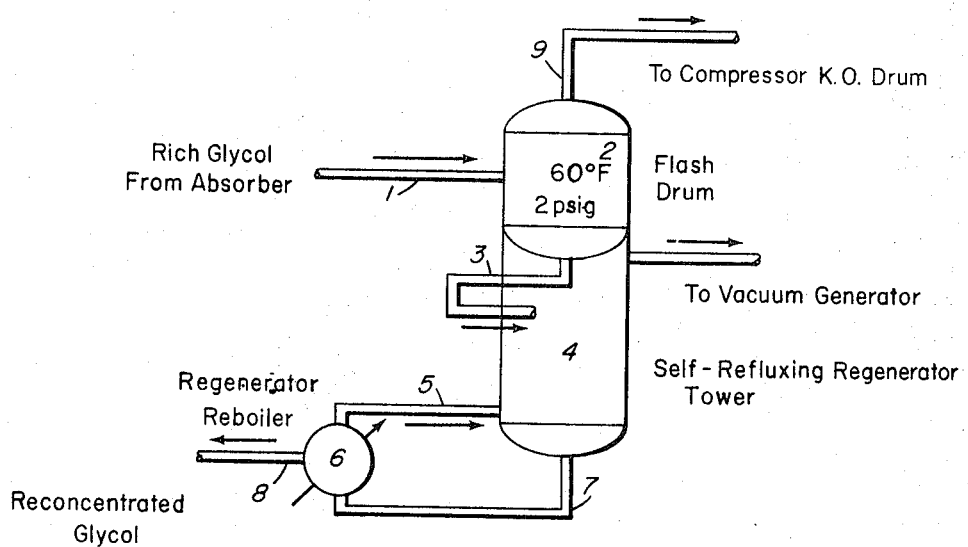
Figure II
IMPROVED GLYCOL REGENERATION SYSTEM
J. A. Alvarez
E. F. Upchurch  Inventors
C. C. Wolfe
By Jack Matalon  Attorney 3,531,449
Patented Sept. 29, 1970

3,531,449
GLYCOL DRYING IN A METHYL CHLORIDE DEHYDRATION PLANT
Jose A. Alvarez, Parsippany, Edward F. Upchurch, Chatham, and Charles C. Wolfe, West Millington, N.J., assignors to Esso Research and Engineering Company, a corporation of Delaware
Filed Oct. 31, 1968, Ser. No. 772,308
Int. Cl. C08d 3/04
U.S. Cl. 260—85.3     6 Claims

ABSTRACT OF THE DISCLOSURE

Spent glycol is regenerated by flashing at reduced pressure and temperature followed by fractionation. The process results in substantially reduced glycol losses and elimination of corrosion problems attending conventional regeneration processes.

BACKGROUND OF THE INVENTION

It is known in the preparation of butyl rubber that a stream is formed overhead in the flash drum by vaporization of the reactor effluent overflow slurry stream. The flash gases contain the diluent methyl chloride, unreacted hydrocarbon monomers, and water vapor. In the past, this stream has been compressed, dried, fractionated, and returned to the reactor as recycle monomer and diluent. However, it has been found that the alumina driers which remove the water in the stream become saturated in a relatively short time, e.g. 24 hours. Therefore, the unsaturated alumina drier must be frequently replaced and regenerated; but these operations are expensive and time consuming.

Furthermore, it has been noted that polymerization poisons are formed during the preparation of the butyl rubber polymer. These poisons are hydrolysis products of methyl chloride and water, e.g. alcohols and ethers. It should be noted that most of these poisons are produced in zones in which water is present in large concentrations. These zones are the flash tank, the first stage recycle gas compressor system and the alumina driers. Moreover, alumina is an effective catalytic agent for promoting hydrolysis.

A method whereby the life of an alumina drier can be extended to substantially longer periods of time, e.g. 5 days or more, is fully described in U.S. Pat. 3,005,808. This method now makes it possible to also remove a considerable amount of the nefarious molecular weight poisons from the recycle monomer and diluent stream. In one embodiment of the invention described in the aforesaid U.S. Pat. 3,005,808, the recycle stream from the flash tank is compressed and cooled; and subsequently treated with a glycol solution; and then passed through alumina driers. Contacting of the methyl chloride stream with the glycol takes place in a glycol absorption tower. It is necessary to regenerate the glycol which leaves the absorption tower since this stream now contains quantities of water, the aforementioned catalyst poisons and dissolved methyl chloride.

The present method of regeneration results in serious corrosion problems in equipment used for regeneration due to the high temperatures of the regeneration at a time when the glycol stream contains significant quantities of water, methyl chloride and other impurities. This results in an accelerated decomposition of methyl chloride with the resulting formation of corrosive hydrolysis compounds (such as hydrogen chloride). Furthermore, substantial glycol losses occur in the regeneration circuit.

SUMMARY OF THE INVENTION

It has now been found that the elimination of the corrosion problems may be achieved by feeding the rich glycol from the absorber to a flash drum without preheating the glycol to undesirably high temperature (i.e. greater than 100° F.).

The rich glycol is depressured when flowing from the absorber to the flash drum of the regeneration unit. Consequently, methyl chloride is vaporized and the rich glycol mixture is autorefrigerated to 45–60° F. The removal of methyl chloride from the glycol at low temperatures virtually eliminates the formation of hydrogen chloride and other corrosive hydrolysis compounds. Additionally, this new regeneration sequence minimizes glycol losses.

Glycol losses are drastically reduced in the flash drum because of the lower operating temperature. Moreover, since the 45–60° F. flash drum bottoms constitutes the feed (and reflux) for the regeneration tower, this autorefrigerated glycol provides a colder reflux than a conventional condenser could with cooling water. These lower reflux temperatures result in the reduction of glycol losses in the regenerator.

Further economies are achieved by stacking the flash drum on top of the self-refluxing tower.

BRIEF DESCRIPTION OF THE DRAWINGS

FIG. I is a schematic diagram of the prior art flow stream for glycol regeneration.

FIG. II is a schematic diagram of the glycol regeneration system of this invention.

DETAILED DESCRIPTION

The butyl rubber polymer of this invention is prepared by reacting about 70 to 95.5 parts by weight, preferably 85 to 99.5, of an isoolefin with about 30 to about 0.5 parts by weight, preferably 15 to about 0.5, of multiolefin. The isoolefin, in general, is a $C_4$ to $C_7$ compound, e.g. isobutylene or 2-methyl-1-butene. The multiolefin, in general, is a $C_4$ to $C_{10}$ conjugated diolefin, e.g. isoprene, butadiene, or piperylene. The preferred polymer is obtained by reacting 95 to 99.5% by weight of isobutylene with about 0.5 to 5% by weight of isoprene.

Mixture of monomers preferably with 1 to 5 volumes of inert diluent, e.g. methyl chloride, should be cooled to a temperature of about 0° to −200° C. and it is preferred that the temperature range be between −60° and 130° C. The cold mixture is polymerized by the addition of a Friedel-Crafts catalyst, preferably an aluminum halide catalyst in a liquid or dissolved form, in conjunction with vigorous agitation. The amount of catalyst is generally about 0.02 to about 0.5% by weight of the admixed olefins.

The polymerization reaction is rapid and the polymer precipitates out of the solution in the form of a slurry or flocculent white solid. The polymer, which is recovered in a flash tank and dried, has a Staudinger molecular weight between about 30,000 and 150,000, preferably 40,000 to 60,000; and an iodine No. of about 0.5 and about 50, preferably between 1 and 15. The preparation of this copolymer is described in U.S. Pats. 2,455,665; 2,356,128; and 2,611,751 which are incorporated herein by reference. The butyl rubber also within the scope of this invention includes those which are halogenated, e.g. chlorinated and brominated; preferably, the range of halogen in the rubber structure is about 0.9 to 1.5 wt. percent for chlorinated butyl rubber and about .15 to 3.0 wt. percent for brominated butyl rubber.

Methods of treating recycle gas (methyl chloride) in butyl rubber processes are described in U.S. Pat. 3,005,808, incorporated herein by reference. These techniques involve scrubbing the recycle gases in a glycol absorption tower. From the overhead in the flash drum is provided a stream comprising about 90 to about 98.0% methyl chloride and 0.4% to about 1% water, 1.0% to 15.0% unreacted hydrocarbons and traces of polymerization poisons. After the stream has psased through a series of coolers, knock-out drums and compressors, it is treated with a glycol solution in the absorption tower. About 1 to 10 gallons of glycol solution are provided for every pound of water entering the tower in the recycle stream and about 99% of the water in the feed and some of the polymerization poisons are absored therein.

Although any alkylene or polyalkylene glycols may be used in the practice of this invention, it is preferred to use an ethylene glycol, di- or triethylene glycol. Other glycols that may be used include propylene glycol, polypropylene glycol, trimethylene glycol, pentaglycol, butylene glycol, tetramethylene glycol, 1,3-butane diol, methyl pentane diol, pentane diol, 3-methyl-1,3-butane diol, pinacol, 2-methyl-2,4-pentane diol.

It is also within the purview of this invention to replace parts of the glycol with an amine. Preferred amines are mono-, di- and tri-alkanol amines, but the especially preferred compounds are mono-, di- and tri-ethanol amines. A glycol-amine solution generally comprises 10 to 30 wt. percent of the amine and 65 to 89.5% of the glycol. More preferably, the amine content is about 15 to about 25 wt. percent of the glycol-amine solution, e.g. 20 wt. percent.

The advantages of this invention may be more readily appreciated by a comparison with the present method of glycol regeneration.

In addition to substantial losses of glycol in the regeneration system, significant corrosion problems are encountered in the regenerating heat exchanger, the flash drum, the regenerator trays and the reboiler due to the elevated temperatures and the high water and methyl chloride content of the glycol stream.

As used throughout the specification and claims, the term "rich glycol" means the bottoms stream of spent glycol from the absorber; the term "regenerated glycol" or "reconcentrated glycol" means glycol which has been processed by the manner of this invention and is in a condition to be reused in the absorption column.

Referring now to FIG. I, a rich glycol stream, 1, from the absorber, passes through a regenerating heat exchanger, 2, where the rich glycol stream is preheated to about 160° F. This hot stream, 3, is then injected into a flash drum, 4, wherein methyl chloride, some of the water and other impurities in the glycol stream are flashed off. Additionally, substantial amounts of glycol are lost in this flashing process. The flash drum bottoms, i.e. liquid glycol containing the remaining water, methyl chloride and impurities is fed through bottoms line, 5, to the regenerator tower, 6, where further flashing occurs. The liquid bottoms of the regenerator tower is fed through line, 7, to the reboiler, 8, where it is partially vaporized and returned into the regenerating tower. The regenerating tower may be a plate and tray type fractionating tower or may be a packed column. Packing such as Raschig ring or ceramic Berl saddles, etc., may be used. The design of these towers is well known to the art. The regenerating tower is operated at a pressure of about 0.25 to about 1.0 p.s.i.a. and a temperature of about 100° F. at the condenser end and about 340° F. at the reboiler end. The reboiler may be an integral part of the regeneration tower.

The reboiler bottoms are reconcentrated glycol. This regenerated glycol is fed through bottoms line, 9, to the regenerative heat exchanger, 2. This cooled stream, 10, is then fed to the absorption tower.

The present invention avoids the problems of the prior art by a modification of this system. Referring now to FIG. II, the regenerating heat exchanger is eliminated and the rich glycol stream from the absorber 1, is fed directly into the flash drum, 2, at about 60° F. and about 17 p.s.i.a. The flash drum may be operated at a temperature range from about 45° F. to about 85° F., preferably 50° F. to about 75° F., more preferably 55° F. to 65° F. The pressure in the flash drum is preferably about 15 to about 25 p.s.i.a., more preferably about 16 to about 18 p.s.i.a., e.g. 17 p.s.i.a. Flash drum, 2, of this invention serves the same purpose as the flash drum of the prior art, except that it is operated at a lower temperature and pressure.

The bottoms stream, 3, of the flash drum is fed into a self refluxing tower, 4. The vapor stream, 5, of the regenerator reboiler, 6, is fed into the self-refluxing tower which is operated at a top pressure of 0.15 to about 1.0 p.s.i.a., more preferably 0.20 to about 0.30 p.s.i.a., e.g. 0.25 p.s.i.a. The bottoms stream, 7, of the self-refluxing tower are fed into the reboiler, 6. The reboiler bottoms stream, 8, is regenerated, reconcentrated glycol which is returned to the glycol absorption tower. The flash drum vapor stream, 9, contains between 50 and 90 percent of the methyl chloride and some of the water which were in the rich glycol stream.

The self-refluxing tower is essentially of the same design as the regenerating tower of the prior art system. It may be either a plate and tray type fractionating tower or it may be a packed column. The design of such towers is well known to the art.

The advantages of this invention are more readily appreciated by reference to the following example.

EXAMPLE 1

A rich glycol stream containing 1.6 wt. percent water, 13.3 wt. percent methyl chloride plus trace amounts of reactor poisons is depressured from the glycol absorber and introduced into a glycol flash drum at 2 p.s.i.g. During the depressuring step, 80% of the methyl chloride present in the rich glycol is vaporized together with smaller portions of water and glycol, thereby autorefrigerating the liquid-vapor mixture to about 60° F.

The vapor is separated from the liquid and recycled to the methyl chloride compressors while the flashed liquid is gravity fed and depressured to a regenerator vacuum tower operating at 0.25 p.s.i.a. top pressure. In this tower, the remaining methyl chloride and water are removed from the glycol, which is reconcentrated to 0.2 wt. percent maximum water content. The reconcentrated glycol is returned to the absorber tower.

The self-refluxing tower temperature varies between 80° F. at the top and 340° F. at the reboiler end. Methyl chloride is removed from the glycol solution at temperatures below 120° F. Significantly no methyl chloride is present in the glycol below the top three trays of the self-refluxing tower.

Since the corrosion rate in a methyl chloride glycol plant is directly related to the hydrolytic decomposition of methyl chloride, reducing the flash drum temperature from the conventional 160° F. to 60° F. of this invention decreases the decomposition of methyl chloride. Thermodynamically and kinetically, any reduction in temperature substantially reduces the decomposition of methyl chloride. Pertinent data have been reported elsewhere in the literature (see for example, R. L. Heppolette and R. E. Robertson, "The Neutral Hydrolysis of the Methyl Halides," Proc. Roy. Soc. A., 252, 273–285, 1959).

Using the method of this invention, the maximum glycol losses for a 10 g.p.m. plant are approximately 50 lbs./day (flash drum 1–2 lbs./day, regenerator 20–30 lbs./day, miscellaneous 10–30 lbs./day) as compared to about 150 to about 250 lbs./day in the conventional regeneration scheme (flash drum 50–100 lbs./day, regenerator 70–120 lbs./day, miscellaneous 10–30 lbs./day).

In the flash drum the glycol vapor pressure (which is directly proportional to the glycol losses) is reduced over 100 times when the temperature is changed from 160 to 60° F., while in the regenerator the glycol vapor pressure is reduced about 3 times when the temperature is reduced from the conventional 100–110° F. to 70–80° F.

It will be readily evident to one skilled in the art that although the invention here is described in particular as a regeneration system for glycol in a methyl chloride dehydration plant, that this system may be used for the regneration of glycol drying in various other types of operations such as vinyl chloride or perchloroethylene dehydration.

Since many modifications and embodiments of this invention are possible without departing from the spirit thereof, this invention is not intended to be limited by the particular embodiments described herein.

What is claimed is:

1. In a proces for preparing butyl rubber, wherein the diluent stream is dried by contacting said diluent stream with glycol in an absorption tower, the improvement which comprises regenerating the glycol by:
    (a) introducing rich glycol from said glycol absorption tower into a flash drum at about 45 to about 85° F. and a pressure of about 15 to about 25 p.s.i.a., whereby volatile portions of the glycol stream are flashed off and a liquid glycol stream containing the remaining water and other impurities passes to the bottom of said flash drum;
    (b) introducing said liquid glycol into the top portion of a self-refluxing tower;
    (c) feeding a vapor stream from a regenerator reboiler into the bottom section of said self-refluxing tower;
    (d) recycling a bottoms portion of glycol from said self-refluxing tower into said regenerator reboiler; and
    (e) removing a reconcentrated glycol stream from said regenerator reboiler bottoms.

2. The process of claim 1 wherein the flash drum and self-refluxing tower form an integral unit, said flash drum being spacially oriented to permit gravity feed of said liquid glycol into the top of said self-refluxing tower.

3. The process of claim 1 wherein the glycol is selected from the group consisting of ethylene glycol, diethylene glycol, triethylene glycol or trimethylene glycol.

4. The process of claim 1 wherein the glycol contains about 10 to about 30 wt. percent of an organic amine.

5. The process of claim 4 wherein said amine is a mono-, di- or trialkanol amine.

6. The process of claim 5 wherein said amine is a mono-, di- or triethanol amine.

References Cited

UNITED STATES PATENTS

| | | | |
|---|---|---|---|
| 3,005,808 | 10/1961 | Kelley et al. | 260—85.3 |
| 3,219,641 | 11/1965 | Tegge et al. | 260—80.7 |

JOSEPH L. SCHOFER, Primary Examiner

R. A. GAITHER, Assistant Examiner

U.S. Cl. X.R.

203—18, 88